Patented Mar. 21, 1939

2,151,212

UNITED STATES PATENT OFFICE 2,151,212

PROCESS FOR THE MANUFACTURE OF POLYSULPHIDE PLASTICS

Gerhard Källner and Gerhard Krause, Ida- und Marienhutte, near Saarau, Silesia, Germany, assignors to Silesia, Verein Chemischer Fabrieken, Ida- und Marienhutte, near Saarau, Germany No Drawing. Application May 4, 1936, Serial No. 77,760. In Germany November 29, 1935

3 Claims. (Cl. 260—79)

This invention relates to a process for the manufacture of elastic artificial masses.

It is known that elastic artificial masses may be obtained by causing dihalogenated paraffin hydrocarbons to react with polysulphides. These condensation products which have high sulphur contents may be treated similarly to raw rubber and yield elastic vulcanisates which are very stable, particularly towards organic solvents, such as benzene hydrocarbons, benzine and oil. A number of processes, which are based on the interaction of paraffin dihalogenides with polysulphides, have been proposed for manufacturing these products. It is of importance in this interaction that homogeneous products should be obtained in as good yield as possible, a requirement which is not easily fulfilled owing to their insolubility and their rubber-like character. Normally the condensation product from the interaction of paraffin dihalogenides with polysulphides is obtained in the form of a coherent, tough and elastic block, which tends to be non-uniform in composition and to occlude relatively large quantities of the reaction liquids which have escaped interaction. Furthermore this product can only be unsatisfactorily and with difficulty washed. Various procedures have been proposed in order to overcome this disadvantage. According to one proposal alcohol is added in order to increase the solubility of the dihalogenide in the aqueous polysulphide solution. Another group of processes is based on preparing the reaction products in a state of fine division similar to latex and purifying the products in this form. For this purpose finely divided difficultly soluble alkaline earth compounds or compounds of earth metals, such as freshly precipitated calcium hydroxide or magnesium hydroxide and/or organic protective colloids, such as albumen, are added to the mixture; as a rule the operation is carried out in the presence of both additions. The resulting product contains the condensation product very finely distributed in water. Washing is effected by decanting with water, the inorganic addition is then dissolved out and finally the condensation product is precipitated from the dispersion in the form of flocks by the addition of alkali. This washing and precipitation of the condensation product from the dispersion is a troublesome and time-consuming process.

According to this invention it has been found that it is possible to avoid a dispersion which is difficult to handle and has to be purified, by carrying out the reaction in the presence of a water-soluble alkylated cellulose, whereby the reaction product is obtained in granular form. This granular product can be extremely easily washed, settles out satisfactorily, can be filtered by suction or pressed, is completely homogeneous and possesses no offensive smell. The yields are almost theoretical since there is no possibility of occlusion. Troublesome purifying by decanting, dissolving out foreign inorganic additions with the aid of acid and coagulation are no longer necessary and the washed grains can be directly shaped on rollers into sheets and be further worked up.

It has been found that water-soluble alkyl celluloses possess the favourable property that a relatively wide limit exists between the point where lump formation can no longer be prevented and the point where division results in the formation of a dispersion. In the case of the organic protective colloids which have hitherto been employed this intermediate stage cannot be attained. In the latter on changing the amounts added either lumps are formed or a dispersion is directly formed. The quantity of alkyl cellulose added is preferably below 1%.

The following examples serve to illustrate how the process of this invention may be carried into effect:

*Example 1.*—A solution of 0.125 kgm. of water-soluble methyl cellulose in 50 litres of water is added to 250 litres of an aqueous solution of sodium tetrasulphide containing 92 kgms. of $Na_2S_4$, the mixture is heated to 40–50° C. and 50 kgms. of dichlorethane are allowed to flow in so slowly that the temperature does not rise above 78–80° C. A yellow granular product is obtained, which on completion of the interaction is washed out several times with hot water.

If instead of methyl cellulose 0.5 kgm. of water-soluble ethyl cellulose are for example employed, a granular product is likewise obtained. The alkyl cellulose may also be directly dissolved in the polysulphide solution. The granular products endure repeated washing with hot water without losing their shape. After washing the artificial mass can be dried and rolled out into sheets.

*Example 2.*—To a solution of 1 kgm. of water-soluble methyl cellulose which precipitates in the form of flocks at 90° C., in 100 litres of cold water 250 litres of an aqueous solution of sodium tetrasulphide containing 184 kgms. of $Na_2S_4$ are added. The mixture is diluted with water to 1,000 litres and caused to react with 100 kgms. of dichlorethane, as described in Example 1. A granular product is obtained which, on completion of the interaction, is washed out several times with hot water.

*Example 3.*—One proceeds as in Example 2, using, however, a water-soluble methyl cellulose which precipitates from the solution in the form of flocks at 50° C.

*Example 4.*—To a solution of 0.5 kg. of water-soluble ethyl cellulose in 250 litres of water 250 litres of an aqueous solution containing 92 kgms. of sodium tetrasulphide are added. The mixture is then reacted with 50 kgms. of dichlorethane, as described in Example 1, and continues the further treatment in accordance with Example 1.

*Example 5.*—One starts with 1,000 litres of sodium polysulphide solution containing 1 kilomol of sodium polysulphide—its formula being $Na_2S_{2.5}$,—and 1 kgm. of methyl cellulose of the quality described in Example 2. The solution is reacted with 100 kgms. of dichlorethane. A granular product is obtained. The reaction and the further treatment is carried out as described in detail in Example 1.

Instead of the polysulphide ($Na_2S_{2.5}$) one kilomol of other polysulphides may be employed, the formula of which is for instance $Na_2S_{4.5}$ or $Na_2S_{3.5}$ or $Na_2S_3$.

In carrying out this invention, in the place of dichlorethane also other dichlorinated paraffin hydrocarbons may be employed, such as dihalogenated compounds of propane, butane, etc.

We claim:

1. A process for preparing elastic artificial masses in granular form which comprises reacting an aqueous solution of a sodium polysulphide with a dihalogenide of paraffin hydrocarbons in the presence of a water soluble alkyl cellulose.

2. A process for preparing elastic artificial masses in granular form which comprises reacting an aqueous solution of a sodium polysulphide with a dihalogenide of paraffin hydrocarbons in the presence of not more than 1% of a water soluble alkyl cellulose, calculated on the amount of the dihalogenide of paraffin hydrocarbons.

3. The process of claim 1 in which the alkyl cellulose is methyl cellulose.

GERHARD KÄLLNER.
GERHARD KRAUSE.